(12) United States Patent
Tanaka

(10) Patent No.: US 9,021,160 B2
(45) Date of Patent: Apr. 28, 2015

(54) STORAGE APPARATUS AND WRITING CONTROL METHOD

(71) Applicant: Fujitsu Limited, Kawasaki-shi, Kanagawa (JP)

(72) Inventor: Michiyuki Tanaka, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 14/075,202

(22) Filed: Nov. 8, 2013

(65) Prior Publication Data
US 2014/0198402 A1  Jul. 17, 2014

(30) Foreign Application Priority Data

Jan. 17, 2013 (JP) ................ 2013-006688

(51) Int. Cl.
*G06F 3/00* (2006.01)
*G06F 13/00* (2006.01)
*G11B 20/12* (2006.01)
*G11B 20/10* (2006.01)

(52) U.S. Cl.
CPC ...... *G11B 20/1217* (2013.01); *G11B 20/10527* (2013.01)

(58) Field of Classification Search
None
See application file for complete search history.

(56) References Cited

U.S. PATENT DOCUMENTS

| 5,434,992 A | 7/1995 | Mattson | |
| 2002/0107876 A1* | 8/2002 | Tsuchida et al. | 707/202 |
| 2010/0290150 A1 | 11/2010 | Sumi et al. | |
| 2012/0227067 A1* | 9/2012 | Ma et al. | 725/32 |

FOREIGN PATENT DOCUMENTS

| JP | 6-161898 | 6/1994 |
| JP | 2010-267345 | 11/2010 |

* cited by examiner

*Primary Examiner* — Zachary K Huson
(74) *Attorney, Agent, or Firm* — Staas & Halsey LLP

(57) ABSTRACT

A processor is configured to determine, if a beginning or an end of a target storage area into which write data is to be written is included in a first storage area in a first storage unit, whether the beginning or the end of the target storage area coincides with a beginning or an end of the first storage area. The processor is configured to extract, if it is determined that the beginning or the end of the target storage area does not coincide with the beginning or the end of the first storage area, data identical to data stored in a sub-storage area in the first storage area from a second storage unit. The sub-storage area is not overlapped with the target storage area. The processor is configured to generate data to be written into the first storage unit by using the extracted data and the write data.

14 Claims, 13 Drawing Sheets

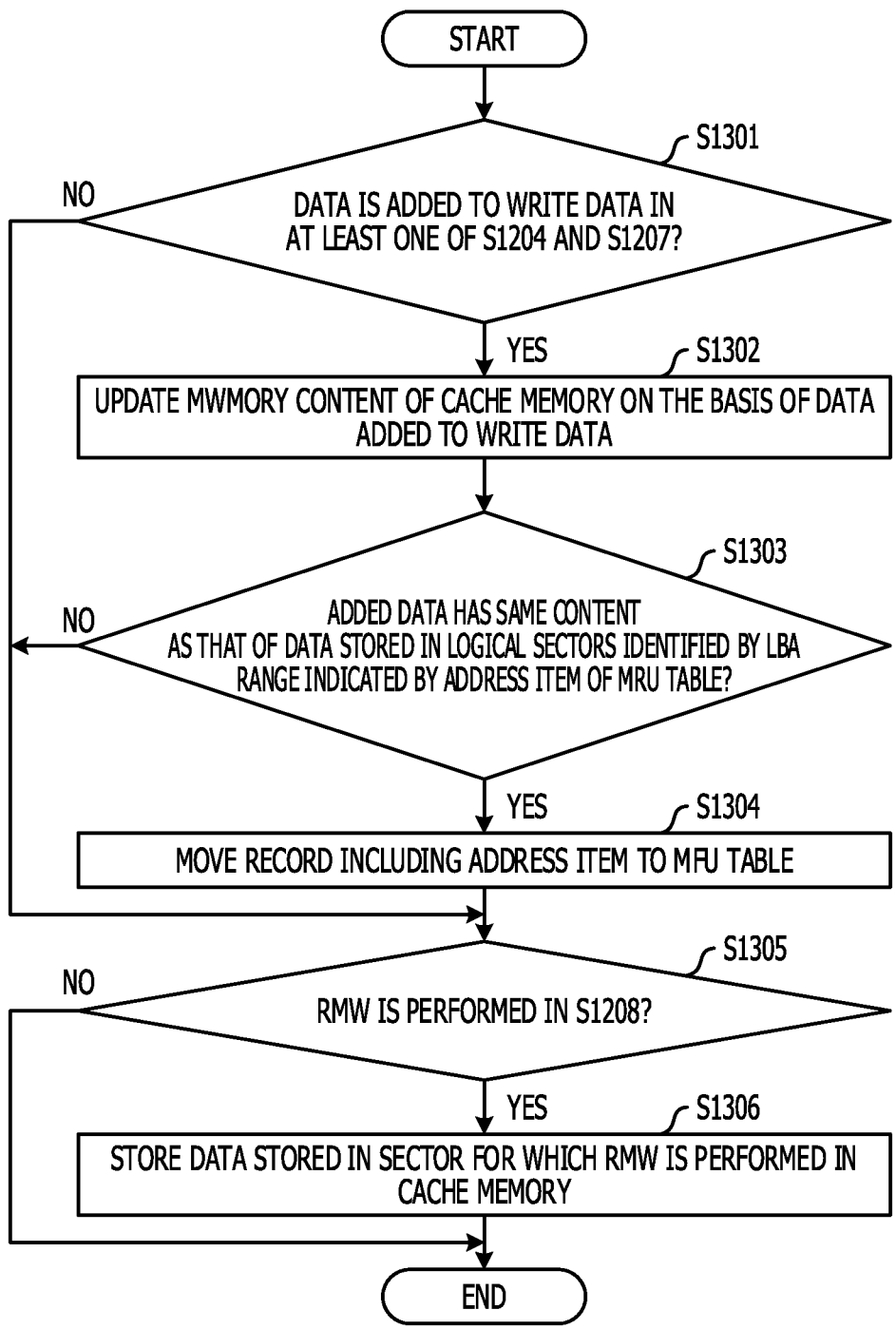

STORAGE APPARATUS AND WRITING CONTROL METHOD

CROSS-REFERENCE TO RELATED APPLICATION

This application is based upon and claims the benefit of priority of the prior Japanese Patent Application No. 2013-006688, filed on Jan. 17, 2013, the entire contents of which are incorporated herein by reference.

FIELD

The embodiments discussed herein are related to a storage apparatus and a writing control method.

BACKGROUND

A read-modify-write (RMW) technique has hitherto been adopted to write data on a disk from and on which data is read out and written in units of sectors. In the RMW, the write data to be written on the disk is processed for the writing in units of sectors and then is written on the disk. The read-modify-write is a technique to read out data from a disk in sectors of an integer number such that the sectors include storage areas into which the write data is to be written, rewrite the data in the storage areas within the read out sectors to the write data, and write the rewritten sectors back into the disk.

Related techniques include, for example, a technique in which, upon reception of data requiring an RMW operation, the start of the RMW operation is delayed for within the time which a disk takes to rotate once and which is substantially the same as the time required for controlling the RMW operation. Upon reception of the remaining data to be sequentially written, the previously received data and the currently received remaining data are written together to one sector without the RMW operation. The related techniques also include a technique in which a multi-planar array of partition distribution data is created, as a collection of all possible maximum and minimum sub-cache sizing, from least recently used (LRU) lists of referenced objects and traces of objects, and a dynamic programming heuristic is applied to the multi-planar array.

Related techniques are disclosed in, for example, Japanese Laid-open Patent Publication No. 2010-267345 and Japanese Laid-open Patent Publication No. 06-161898.

However, with the techniques described above, in writing of write data into a disk in units of sectors, the data used for processing the write data is read out from the disk to disadvantageously increase the time for a writing process of the write data.

SUMMARY

According to an aspect of the present invention, provided is a storage apparatus including a first storage unit, a second storage unit, and a processor. The first storage unit includes storage areas partitioned in units of a certain length. Data of the certain length is read out from and written into each partitioned storage area. The second storage unit is configured to store therein cache data identical to data of the certain length, which is stored in one of the storage areas in the first storage unit, in association with the one of the storage areas. The processor is configured to determine, if a beginning or an end of a target storage area into which write data is to be written is included in a first storage area in the first storage unit, whether the beginning or the end of the target storage area coincides with a beginning or an end of the first storage area. The processor is configured to extract, if it is determined that the beginning or the end of the target storage area does not coincide with the beginning or the end of the first storage area, complementary data identical to data stored in a sub-storage area in the first storage area from the second storage unit. The sub-storage area is not overlapped with the target storage area. The processor is configured to generate data to be written into the first storage unit by using the extracted complementary data and the write data. The processor is configured to control writing of the generated data into the first storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a flowchart illustrating an exemplary data update process.

DESCRIPTION OF EMBODIMENTS

A storage apparatus and a writing control method according to embodiments will herein be described in detail with reference to the attached drawings.

Writing Control Process of Storage Apparatus

Figure 1:
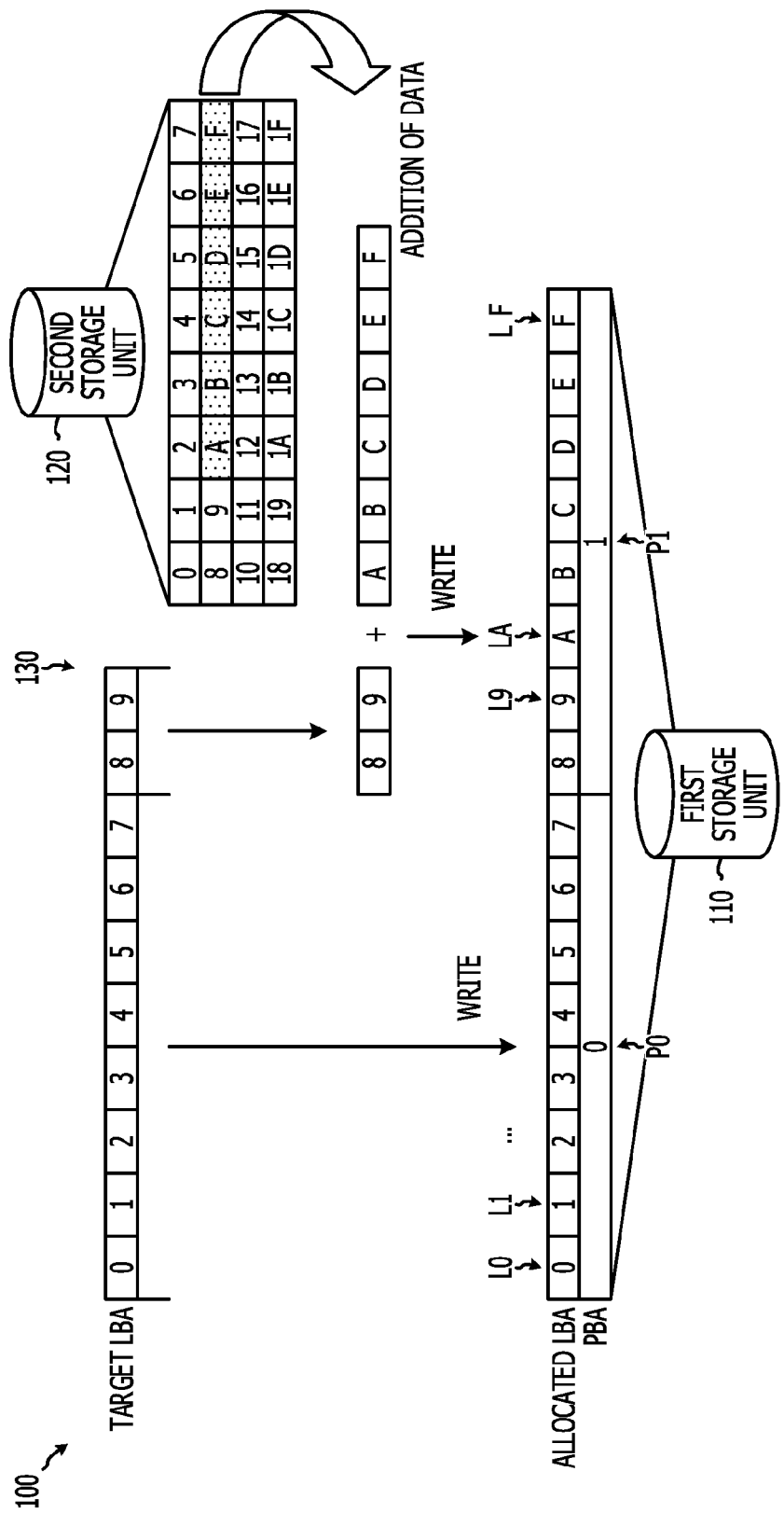
FIG. 1 is a diagram illustrating a writing control process of a storage apparatus according to an embodiment.

FIG. 1 is a diagram illustrating a writing control process of a storage apparatus 100 according to an embodiment. Referring to FIG. 1, the storage apparatus 100 is a computer including a first storage unit 110 and a second storage unit 120.

The first storage unit 110 is a storage medium which includes storage areas partitioned in units of a certain length. In the first storage unit 110, data of the certain length is read out from and written into each partitioned storage area. The first storage unit 110 is, for example, a disk in which a collection of eight 512-byte (512 B) logical sectors is processed as a four-kilo-byte (4 kB) physical sector. The first storage unit 110 may be a flash read only memory (ROM). In the example in FIG. 1, the first storage unit 110 includes a storage area identified by a physical address "0" and a storage area identified by a physical address "1". Each physical address may be hereinafter referred to as a physical block address (PBA). The storage area identified by each PBA may be hereinafter referred to as a "storage area P# (# is the value of the PBA)". For example, the storage area identified by a PBA "0" may be referred to as a "storage area P0".

The storage area P0 identified by the PBA "0" has logical addresses "0" to "7" allocated thereto and is processed as a collection of the storage areas identified by the logical addresses "0" to "7". Similarly, a storage area P1 identified by a PBA "1" has logical addresses "8" to "F" allocated thereto and is processed as a collection of the storage areas identified by the logical addresses "8" to "F". Each logical address may be hereinafter referred to as a logical block address (LBA). The storage area identified by each LBA may be hereinafter referred to as a "storage area L# (# is the value of the LBA). For example, the storage area identified by an LBA "0" may be referred to as a "storage area L0".

The second storage unit 120 has a response performance higher than that of the first storage unit 110 and is a storage medium from and into which data is read out and written in units of a length smaller than the certain length. The second storage unit 120 stores therein data identical to the data written into the first storage unit 110 by the storage apparatus 100 through the RMW operation. The second storage unit 120 is, for example, a cache memory from and into which data is read out and written in units of 512 B. In the example in FIG. 1, a number and/or letter given to each partition in the second storage unit 120 indicates which storage area in the first storage unit 110 has the data identical to the data stored in the corresponding partition. For example, the data stored in a partition to which "0" is given in the second storage unit 120 is identical to the data stored in the storage area L0 identified by the LBA "0" in the first storage unit 110.

Taking a case in which the storage apparatus 100 has accepted write data 130 as an example, an exemplary process of controlling writing of the write data 130 into the first storage unit 110 will now be described. In the example in FIG. 1, a number given to each partition in the write data 130 represents the LBA that identifies the storage area into which the data in the partition in the write data 130 is to be written. For example, the data in the partition to which "0" is given in the write data 130 is written into the storage area L0 identified by the logical address "0" in the first storage unit 110.

In the example in FIG. 1, the storage apparatus 100 accepts the write data 130 in which the storage areas L0 to L9 identified by LBAs "0" to "9", respectively, are the storage areas into which the data is to be written (such storage areas may be hereinafter referred to as target storage areas). Upon acceptance of the write data 130, the storage apparatus 100 determines whether the beginning or the end of the target storage areas coincides with the beginning or the end of any storage area partitioned in units of the certain length in the first storage unit 110. In the example in FIG. 1, the beginning of the target storage areas L0 to L9 coincides with the beginning of the storage area P0 while the end of the target storage areas L0 to L9 does not coincide with the end of any of the storage areas P0 and P1.

The coincidence of the beginning of the target storage areas with the beginning of any storage area partitioned in units of the certain length in the first storage unit 110 may be hereinafter referred to as "the beginning is aligned". Similarly, the coincidence of the end of the target storage areas with the end of any storage area partitioned in units of the certain length in the first storage unit 110 may be hereinafter referred to as "the end is aligned". In addition, no coincidence of the beginning of the target storage areas with the beginning of any storage area partitioned in units of the certain length in the first storage unit 110 may be hereinafter referred to as "the beginning is unaligned". Similarly, no coincidence of the end of the target storage areas with the end of any storage area partitioned in units of the certain length in the first storage unit 110 may be hereinafter referred to as "the end is unaligned".

Since the end is unaligned in the above example, the storage apparatus 100 complements the end side of the write data 130 to convert the data having an unaligned end into data having an aligned end and, then, writes the converted data into the first storage unit 110. For example, the storage apparatus 100 searches the second storage unit 120 for pieces of data to be added to the end side of the write data 130, which are stored in storage areas LA to LF identified by LBAs "A" to "F", respectively, to add the data resulting from the search to the end of the write data 130. The storage apparatus 100 is capable of converting the write data 130 having an unaligned end into the data having an aligned end in the above-described manner.

The storage apparatus 100 controls writing of the converted data having an aligned beginning and an aligned end into the disk. For example, the storage apparatus 100 writes the data to be written into the areas identified by the LBAs "0" to "7" in the converted data into the storage area P0 identified by the PBA "0" to which the LBAs "0" to "7" are allocated. In addition, the storage apparatus 100 writes the data to be written into the areas identified by LBAs "8" to "F" in the converted data into the storage area P1 identified by the PBA "1" to which the LBAs "8" to "F" are allocated. The storage apparatus 100 is capable of decreasing the number of times of access to the first storage unit 110 in the writing of the write data 130 into the first storage unit 110 in the above-described manner to speed up the writing of data into the first storage unit 110.

Exemplary Hardware Configuration of Storage Apparatus

Figure 2:
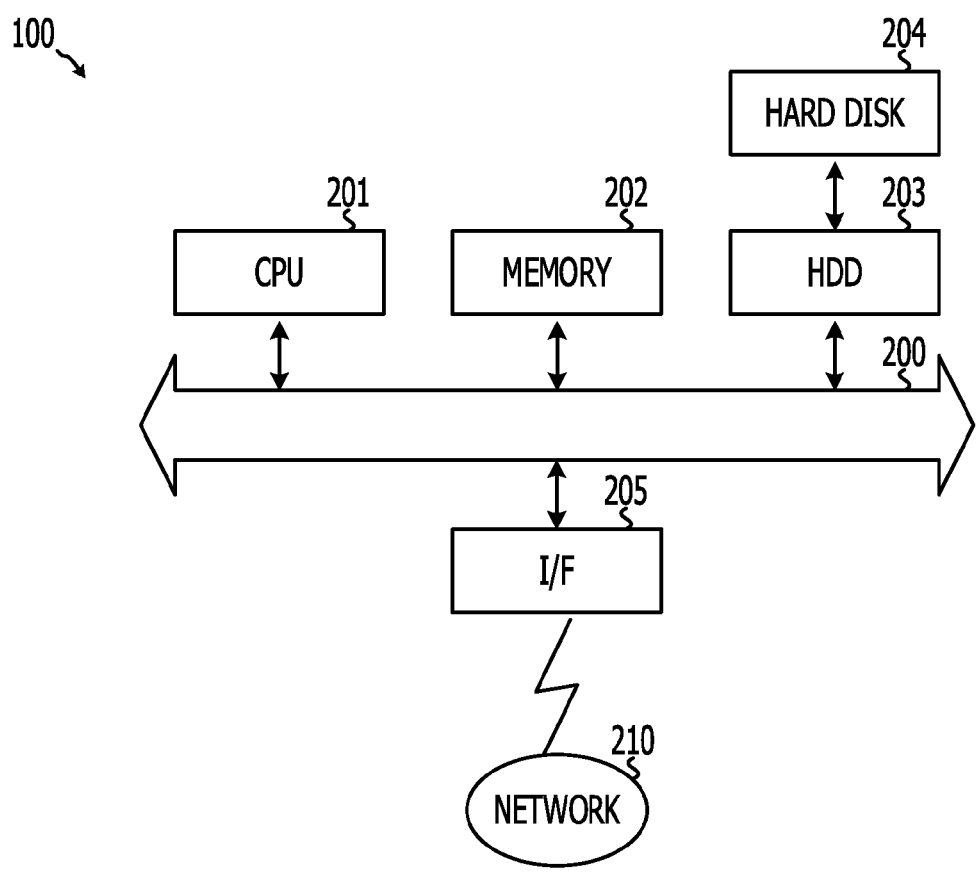
FIG. 2 is a block diagram illustrating an exemplary hardware configuration of a storage apparatus.

FIG. 2 is a block diagram illustrating an exemplary hardware configuration of the storage apparatus 100. Referring to FIG. 2, the storage apparatus 100 includes a central processing unit (CPU) 201, a memory 202, a hard disk drive (HDD) 203, a hard disk 204, and an interface (I/F) 205. The above components are connected to each other via a bus 200.

The CPU 201 controls the entire storage apparatus 100. The memory 202 stores a program, such as a boot program. The memory 202 is used as a working area of the CPU 201. The memory 202 is a storage medium realizing the second storage unit 120. The memory 202 stores therein a most recently used (MRU) table 300 illustrated in FIG. 3 and a most frequently used (MFU) table 400 illustrated in FIG. 4. The memory 202 is, for example, a random access memory (RAM) or the like. Part of the memory 202 may be a read-only memory (ROM) or the like.

The HDD 203 controls reading and writing of data from and into the hard disk 204 under the control of the CPU 201. The hard disk 204 stores therein the data that is written under the control of the HDD 203. The hard disk 204 is a storage medium realizing the first storage unit 110.

The I/F 205 is connected to a network 210, such as a local area network (LAN), a wide area network (WAN), or the Internet, via a communication line and is connected to another apparatus via the network 210. The I/F 205 serves as an internal interface with the network 210 and controls input and output of data into and from an external apparatus. For example, a modem or a LAN adapter may be adopted for the I/F 205.

The storage apparatus 100 may include a flash memory and a solid state drive (SSD) that controls reading and writing of data into and from the flash memory. When the storage apparatus 100 includes the SSD controlling the reading and writing of data into and from the flash memory and the flash memory, the HDD 203 and the hard disk 204 described above may be omitted.

Memory Content of MRU Table

Figure 3:
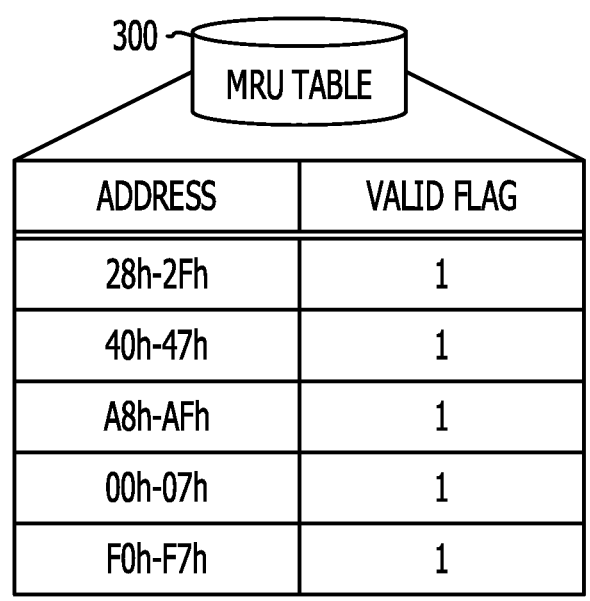
FIG. 3 is a diagram illustrating an exemplary memory content of an MRU table.

FIG. 3 is a diagram illustrating an exemplary memory content of an MRU table 300. As described above, the MRU table 300 is stored in the memory 202. The MRU table 300 manages the data stored in the second storage unit 120 and, more specifically, manages the data which has been used in the most recent RMW operation among the data stored in the second storage unit 120.

The MRU table 300 includes an address item and a valid flag item. The value of each item is stored as a record for each address. An LBA range in the first storage unit 110 is stored in the address item. In the address item, "h" is a suffix indicating that the LBA is represented in a hexadecimal form.

A valid flag is stored in the valid flag item. The valid flag indicates whether replicated data identical to the data stored in the storage areas identified by each LBA range in the address item is stored in the second storage unit 120. In the example in FIG. 3, the valid flag having a value of "1" indicates that the replicated data is stored in the second storage unit 120 and the valid flag having a value of "0" indicates that the replicated data is not stored in the second storage unit 120.

The MRU table 300 may further include an item storing LBA ranges that each identify the storage areas in the second storage unit 120 in which the replicated data identical to the data stored in the storage areas identified by each LBA range in the address item is stored.

In the MRU table 300, an upper limit may be set for the number of records. If the number of records in the MRU table 300 reaches the upper limit, the storage apparatus 100 deletes the record that has been added to the MRU table 300 earliest when a new record is to be added. When the storage apparatus 100 deletes a record from the MRU table 300, the storage apparatus 100 also deletes the data corresponding to the record to be deleted, which is stored in the second storage unit 120.

Memory Content of MFU Table

Figure 4:
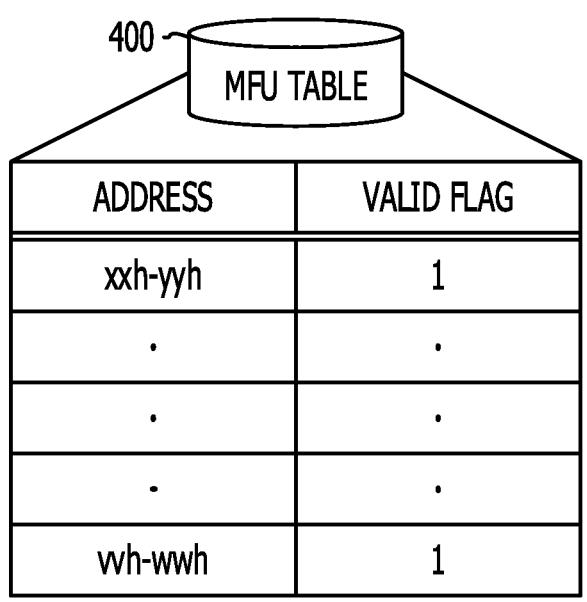
FIG. 4 is a diagram illustrating an exemplary memory content of an MFU table.

FIG. 4 is a diagram illustrating an exemplary memory content of an MFU table 400. As described above, the MFU table 400 is stored in the memory 202. The MFU table 400 manages the data stored in the second storage unit 120 and, more specifically, manages the data which has been frequently used in the RMW operation among the data stored in the second storage unit 120.

The MFU table 400 includes an address item and a valid flag item. The value of each item is stored as a record for each address. An LBA range in the disk is stored in the address item. In the address item, "h" is a suffix indicating that the LBA is represented in a hexadecimal form.

A valid flag is stored in the valid flag item. The valid flag indicates whether replicated data identical to the data stored in the storage areas identified by each LBA range in the address item is stored in the second storage unit 120. In the example in FIG. 4, the valid flag having a value of "1" indicates that the replicated data is stored in the second storage unit 120 and the valid flag having a value of "0" indicates that the replicated data is not stored in the second storage unit 120.

The MFU table 400 may further include an item storing LBA ranges that each identify the storage areas in the second storage unit 120 in which the replicated data identical to the data stored in the storage areas identified by each LBA range in the address item is stored.

In the MFU table 400, an upper limit may be set for the number of records. If the number of records in the MFU table 400 reaches the upper limit, the storage apparatus 100 deletes the record that has been added to the MFU table 400 earliest when a new record is to be added. When the storage apparatus 100 deletes a record from the MFU table 400, the storage apparatus 100 also deletes the data corresponding to the data to be deleted, which is stored in the second storage unit 120.

Exemplary Functional Configuration of Storage Apparatus

An exemplary functional configuration of the storage apparatus 100 will now be described with reference to FIG. 5.

Figure 5:
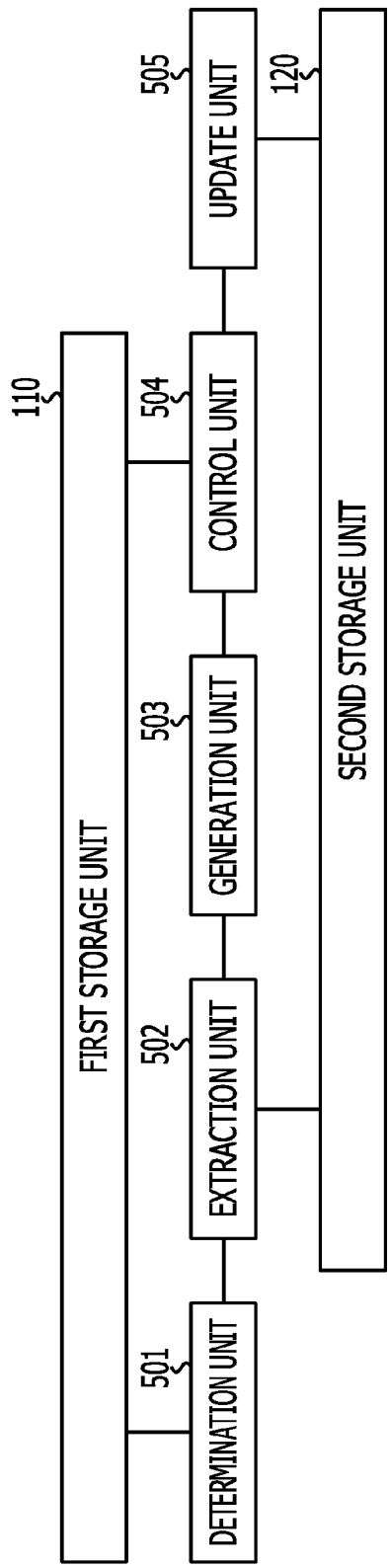
FIG. 5 is a block diagram illustrating an exemplary functional configuration of a storage apparatus.

FIG. 5 is a block diagram illustrating an exemplary functional configuration of the storage apparatus 100. Referring to FIG. 5, the storage apparatus 100 includes the first storage unit 110, the second storage unit 120, a determination unit 501, an extraction unit 502, a generation unit 503, a control unit 504, and an update unit 505.

The first storage unit 110 is a storage medium which includes storage areas partitioned in units of a certain length and in which data of the certain length is read out from and written into each partitioned storage area. The first storage unit 110 is, for example, a disk in which pieces of data in units of 4 kB are read out from and written into the storage areas partitioned in units of 4 kB. When the first storage unit 110 is a disk, the storage areas partitioned in units of the certain length are, for example, the physical sectors of the disk.

Disks of one type process data in units of 512 B on an interface to the storage apparatus 100 and process data in units of 4 kB on a storage medium. Such a type of disks, which processes data in units of 512 B on the interface and processes data in units of 4 kB on the storage medium, may be hereinafter referred to as a "first type".

Disks of another type process data in units of 4 kB on both an interface to the storage apparatus 100 and a storage medium. Such a type of disks, which processes data in units of 4 kB on both the interface and the storage medium, may be hereinafter referred to as a "second type". The first storage unit 110 realizes its function by, for example, the hard disk 204 illustrated in FIG. 2. A case is exemplified in the following description in which the first storage unit 110 is a disk and the storage areas in units of a certain length are the physical sectors of the disk.

The second storage unit 120 is a storage medium storing data identical to the data of the certain length stored in a physical sector of the disk. The second storage unit 120 is, for example, a cache memory which has a response performance higher than that of the disk and from and on which data is read out and written in units of 512 B. The memory content of the second storage unit 120 is identified by, for example, the MRU table 300 or the MFU table 400 described above. The second storage unit 120 realizes its function by, for example, the memory 202 illustrated in FIG. 2. A case is exemplified in the following description in which the second storage unit 120 is a cache memory.

The determination unit 501 determines whether the beginning or the end of the target storage areas coincides with the beginning or the end of a physical sector in which the beginning or the end of the target storage areas is included. The write data 130 is, for example, received from another apparatus via the I/F 205. The write data 130 may be input with a keyboard (not illustrated) of the storage apparatus 100.

The determination unit 501 determines at least one of whether the beginning of the target storage areas coincides with the beginning of the physical sector of the disk and whether the end of the target storage areas coincides with the end of the physical sector of the disk. Accordingly, the extraction unit 502 is capable of acquiring the determination of the inconsistency by the determination unit 501 as a trigger to extract data. The determination unit 501 realizes its function by the CPU 201 that executes the program stored in the memory 202 illustrated in FIG. 2. The result of the determination by the determination unit 501 is stored in, for example, the memory 202.

If the determination unit 501 determines that the beginning or the end of the target storage areas does not coincide with the beginning or the end of the physical sector, the extraction unit 502 extracts data identical to the data stored in storage areas that are not overlapped with the target storage areas in the physical sector from the cache memory. For example, if the determination unit 501 determines that the beginning of the target storage areas does not coincide with the beginning of the physical sector, the extraction unit 502 extracts data identical to the data stored in storage areas preceding the target storage areas within the physical sector from the cache memory.

For example, if the determination unit 501 determines that the end of the target storage areas does not coincide with the end of the physical sector, the extraction unit 502 extracts data identical to the data stored in storage areas succeeding the target storage areas within the physical sector from the cache memory. Accordingly, the generation unit 503 is capable of acquiring the data used in generation of data to be written on the disk from the extraction unit 502. The extraction unit 502 realizes its function by the CPU 201 that executes the program stored in the memory 202 illustrated in FIG. 2. The data extracted by the extraction unit 502 is stored in, for example, the memory 202.

The generation unit 503 generates data to be written on the disk by using the data extracted by the extraction unit 502 and the write data 130. For example, a case will now be described in which data identical to the data stored in storage areas preceding the target storage areas within the physical sector has been extracted by the extraction unit 502. In this case, since the beginning is unaligned, the generation unit 503 adds the extracted data to the beginning of the write data 130 to generate the data having an aligned beginning, which is written on the disk.

For example, a case will now be described in which data identical to the data stored in storage areas succeeding the target storage areas within the physical sector has been extracted by the extraction unit 502. In this case, since the end is unaligned, the generation unit 503 adds the extracted data to the end of the write data 130 to generate the data having an aligned end, which is written on the disk. It is possible for the generation unit 503 to generate the data capable of being written in units of physical sectors in the above-described manner. The data capable of being written in units of physical sector is, for example, data corresponding to the physical sectors of an integer number, which has an aligned beginning and an aligned end.

The data corresponding to the physical sectors of an integer number, which has an aligned beginning and an aligned end, may be hereinafter simply referred to as "aligned data". The data having an unaligned beginning or an unaligned end may be hereinafter simply referred to as "unaligned data". The generation unit 503 realizes its function by the CPU 201 that executes the program stored in, for example, the memory 202 illustrated in FIG. 2.

The control unit 504 controls the writing of the data generated by the generation unit 503 on the disk. The control unit 504 may control the writing of the write data 130 on the disk if the determination unit 501 determines that the beginning and the end of the target storage areas coincide with the beginning and the end of any physical sector of the disk. If the data having an aligned beginning and an aligned end is not generated by the generation unit 503, the control unit 504 may write the write data 130 on the disk through the RMW operation.

For example, when the data is to be written on a disk, the control unit 504 may perform different writing operations for different types of disks on which the data is to be written. The writing operation in a case in which the disk on which the data is to be written is the first type disk described above may be hereinafter referred to as a "first writing operation". The writing operation in a case in which the disk on which the data is to be written is the second type disk described above may be hereinafter referred to as a "second writing operation".

First Writing Operation

When the disk is of the first type, the control unit 504 performs the first writing operation. For example, if the data generated by the generation unit 503 is aligned data, the control unit 504 transmits the data generated by the generation unit 503 to the disk in units of 512 B as a write command. The disk receives the data generated by the generation unit 503 in units of 512 B and integrates the received data into data in units of 4 kB to write the data on the physical sector of the disk.

For example, if the data generated by the generation unit 503 is not aligned data, the control unit 504 transmits the data generated by the generation unit 503 to the disk in units of 512 B as a write command. The disk receives the data generated by the generation unit 503 in units of 512 B and generates aligned data from the received data by the RMW operation to write the data on the physical sector of the disk.

For example, if the determination unit 501 determines that the beginning and the end of the target storage areas coincide with the beginning and the end of any physical sector, the control unit 504 transmits the write data 130 to the disk as a write command. The disk writes the received write data 130 on the physical sector of the disk.

For example, if the generation unit 503 is not capable of generating data to be written on the disk, the control unit 504 transmits the write data 130 to the disk as a write command. The disk generates aligned data from the received write data 130 by the RMW operation to write the data on the physical sector of the disk.

Second Writing Operation

When the disk is of the second type, the control unit 504 performs the second writing operation. For example, if the data generated by the generation unit 503 is aligned data, the control unit 504 transmits the aligned data generated by the generation unit 503 to the disk in units of 4 kB as a write command. The disk writes the received data in units of 4 kB on the physical sector of the disk.

For example, if the data generated by the generation unit 503 is not aligned data, the control unit 504 generates aligned data from the data generated by the generation unit 503 by the RMW operation. Then, the control unit 504 transmits the generated aligned data to the disk in units of 4 kB as a write command. The disk writes the received data in units of 4 kB on the physical sector of the disk.

For example, if the determination unit 501 determines that the beginning and the end of the target storage areas coincide with the beginning and the end of any physical sector, the control unit 504 transmits the write data 130 to the disk as a write command. The disk writes the received write data 130 in units of physical sectors on the physical sector of the disk.

For example, if the generation unit 503 is not capable of generating data to be written on the disk, the control unit 504 generates aligned data from the write data 130 by the RMW operation to transmit the generated aligned data to the disk in units of 4 kB as a write command. The disk writes the received data in units of 4 kB on the physical sector of the disk. The control unit 504 realizes its function by the CPU 201 that executes the program stored in, for example, the memory 202 illustrated in FIG. 2.

The update unit 505 updates the data associated with the physical sector in the cache memory on the basis of the data generated by the generation unit 503. For example, if data identical to the data stored in the physical sector is stored in the cache memory when the data generated by the generation unit 503 is to be written on the physical sector under the control of the control unit 504, the update unit 505 updates the data associated with the physical sector in the cache memory with the data identical to the data to be written. Accordingly, the control unit 504 is capable of updating the data stored in the cache memory with the data identical to the most recent data stored in the physical sector.

If the beginning or the end of the target storage areas is included in any physical sector, data identical to the data in which is not stored in the cache memory, the update unit 505 reads out the data stored in the physical sector from the disk to store the read out data in the cache memory in association with the physical sector. For example, when the RMW operation has been performed by the control unit 504, the update unit 505 stores data identical to the data stored in the physical sector subjected to the RMW operation in the cache memory. Accordingly, the control unit 504 is capable of writing data without the RMW operation in the subsequent writing of the data on the physical sector. The update unit 505 realizes its function by the CPU 201 that executes the program stored in, for example, the memory 202 illustrated in FIG. 2.

If a certain number of pieces or more of data are stored in the cache memory, the update unit 505 may delete the oldest data in the certain number of pieces or more of data. This allows the update unit 505 to store the most recent data in the cache memory while suppressing the usage of the cache memory.

If a first number of pieces or more of data, from which data has not been extracted by the extraction unit 502, are stored in the cache memory, the update unit 505 may delete the oldest data in the first number of pieces or more of data from which data has not been extracted by the extraction unit 502. This allows the update unit 505 to store the most recent data in the cache memory while suppressing the usage of the cache memory.

If a second number of pieces or more of data, from which data has been extracted by the extraction unit 502, are stored in the cache memory, the update unit 505 may delete the oldest data in the second number of pieces or more of data from which data has been extracted by the extraction unit 502. This allows the update unit 505 to store the most recent data in the cache memory while suppressing the usage of the cache memory.

Exemplary Operations of Storage Apparatus

Exemplary operations of the storage apparatus 100 will now be described with reference to FIG. 6 to FIG. 11. The exemplary operation of the storage apparatus 100 when the storage apparatus 100 performs the first writing operation described above may be hereinafter referred to as a "first exemplary operation". The exemplary operation of the storage apparatus 100 when the storage apparatus 100 performs the second writing operation described above may be hereinafter referred to as a "second exemplary operation".

First Exemplary Operation

Figure 6:
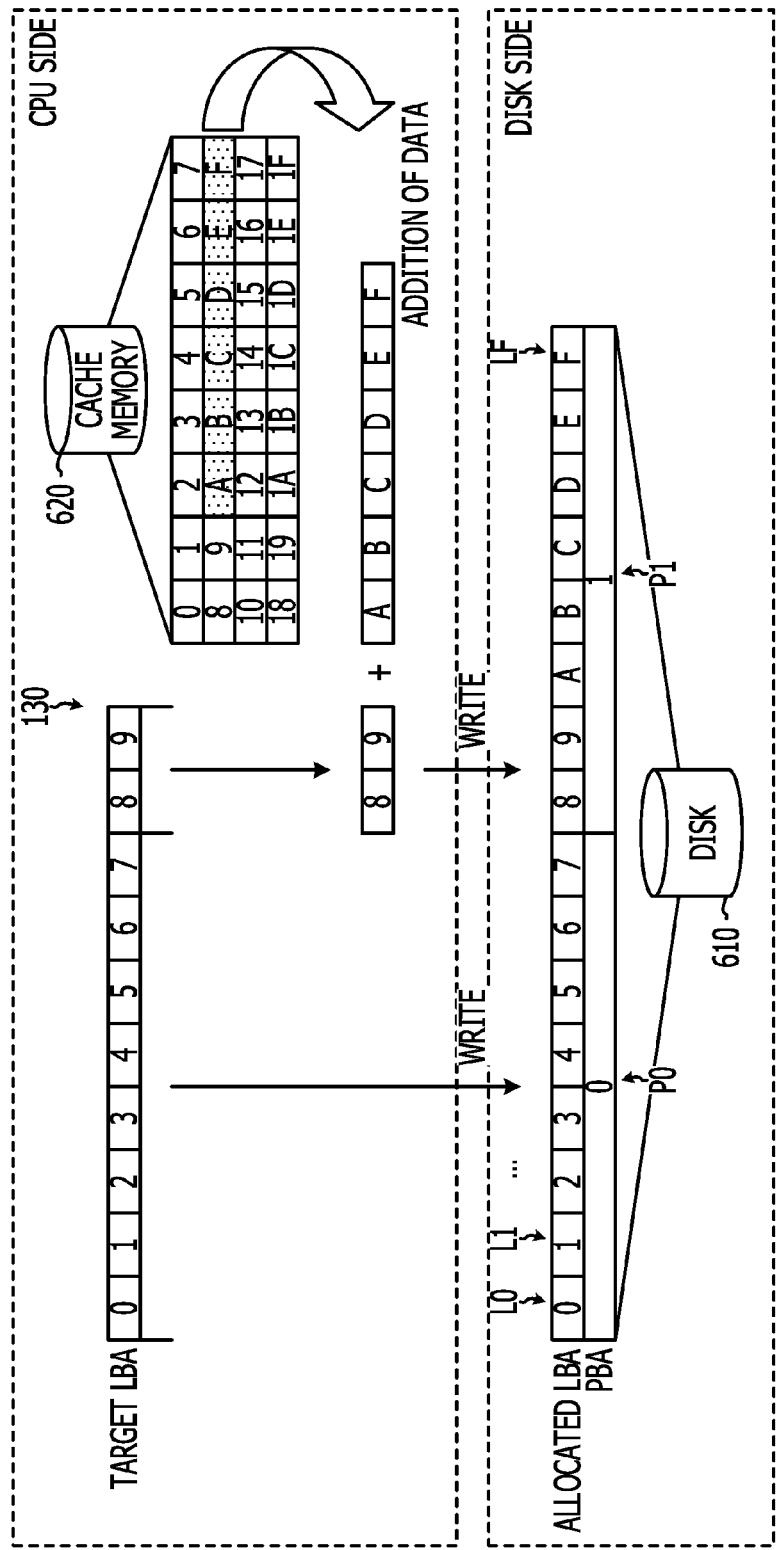
FIG. 6 is a diagram illustrating a first exemplary operation.
Figure 7:
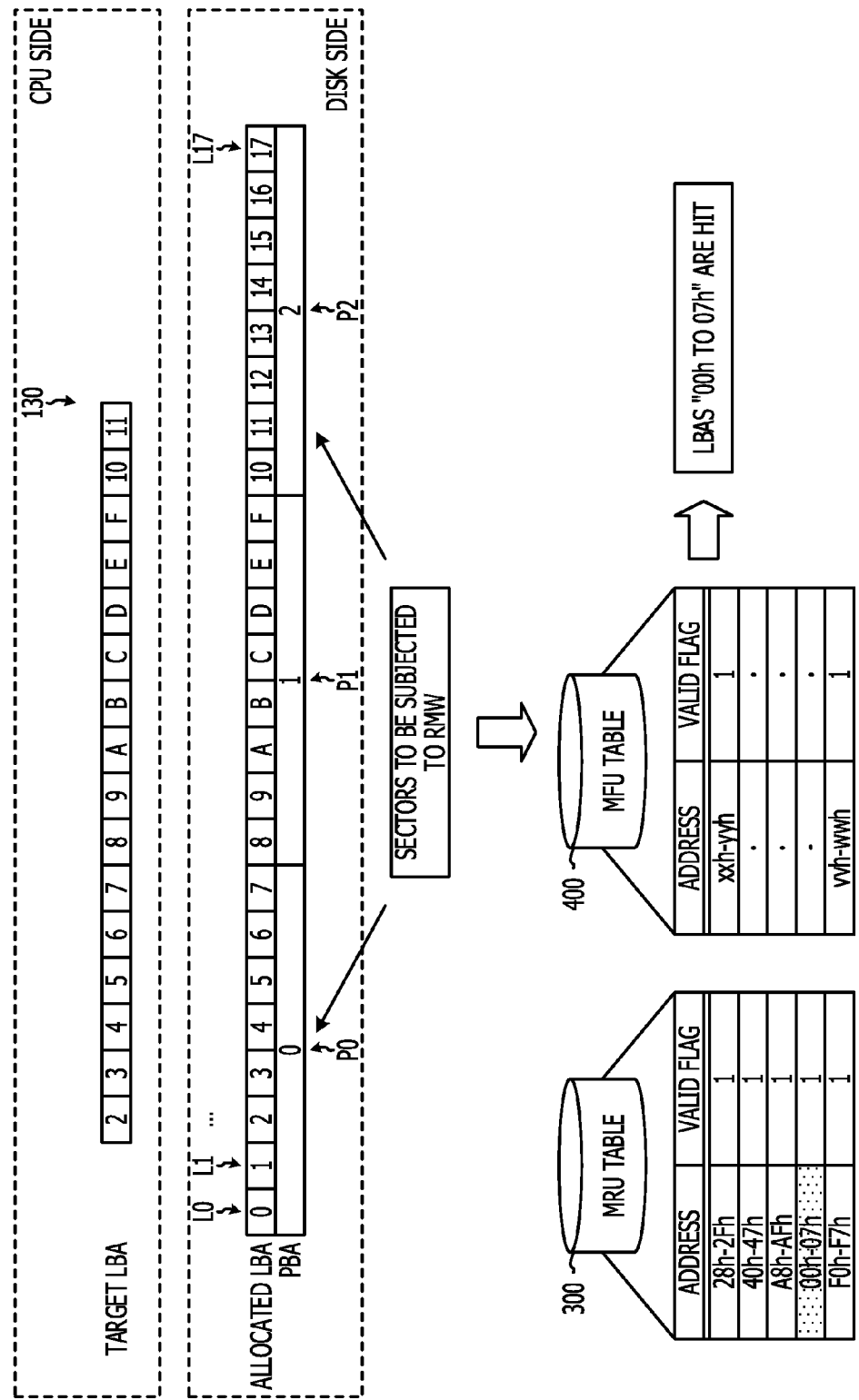
FIG. 7 is a diagram illustrating a first exemplary operation.
Figure 8:
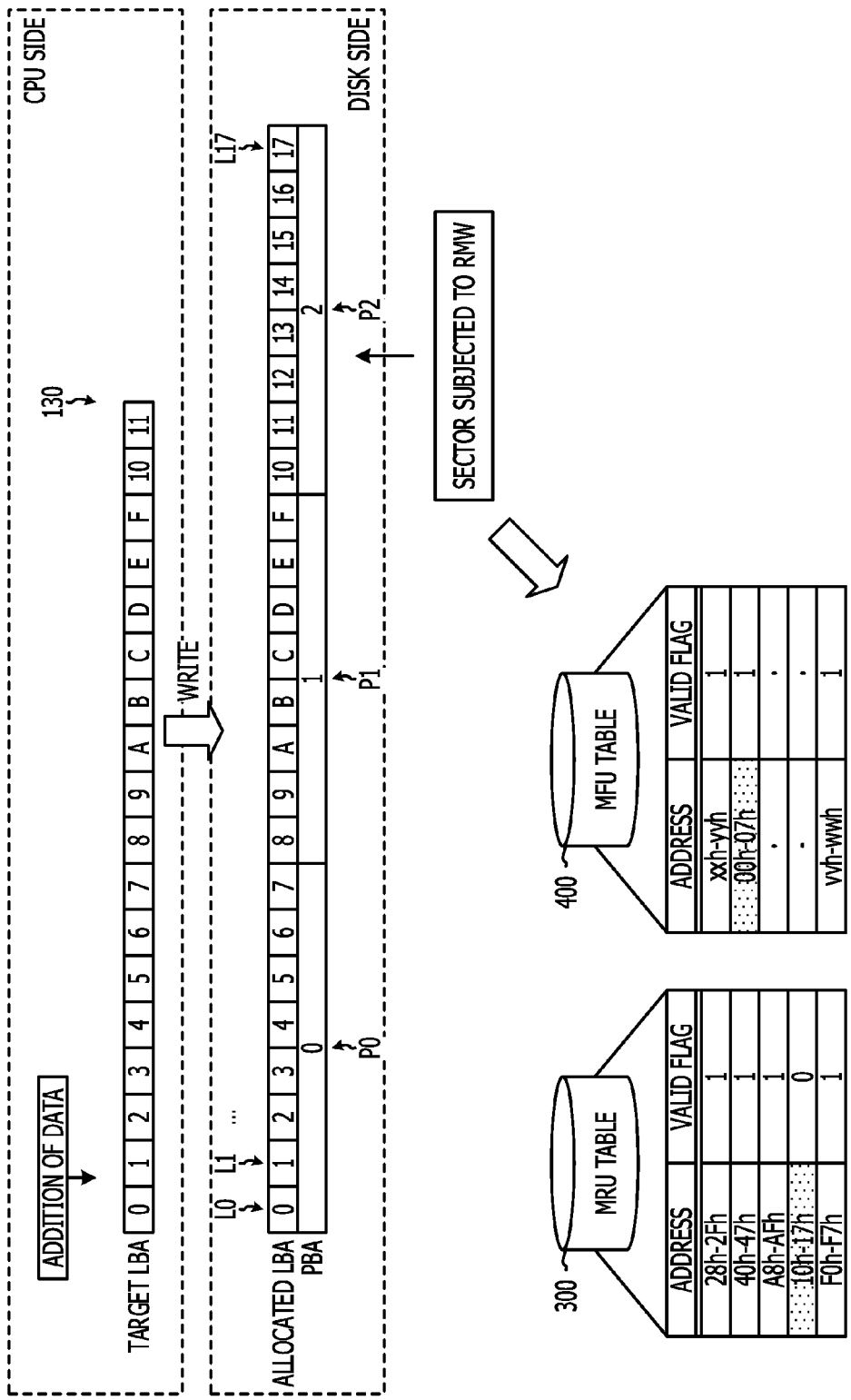
FIG. 8 is a diagram illustrating a first exemplary operation.

FIG. 6 to FIG. 8 are diagrams illustrating the first exemplary operation. An exemplary control of the writing on a disk in the first exemplary operation will now be described with reference to FIG. 6. Referring to FIG. 6, the storage apparatus 100 includes a disk 610 and a cache memory 620.

The disk 610 is a storage medium which includes physical sectors partitioned in units of a certain length and in which data of the certain length is read out from and written into each partitioned physical sector. In the example in FIG. 6, the disk 610 processes a collection of eight 512-B logical sectors as a 4-kB physical sector. Accordingly, data is read out from and written on the disk 610 in units of 4 kB.

More specifically, the disk 610 processes a collection of 512-B logical sectors L0 to L7 identified by the LBAs "0" to "7", respectively, as a 4-kB physical sector P0 identified by the PBA "0". The disk 610 processes a collection of 512-B logical sectors L8 to LF identified by the LBAs "8" to "F", respectively, as a 4-kB physical sector P1 identified by the PBA "1".

The cache memory 620 is a storage medium which has a response performance higher than that of the disk 610 and from and on which data is read out and written in units of 512 B. Replicated data identical to the data that has been written on the disk 610 by the storage apparatus 100 through the RMW operation is stored in the cache memory 620. The storage apparatus 100 controls the writing of the write data 130 on the disk 610 upon acceptance of the write data 130.

An exemplary process of controlling the writing of the write data 130 on the disk 610 will now be described, taking a case in which the storage apparatus 100 has accepted unaligned write data 130 as an example. The unaligned write data 130 is data in which the beginning or the end of the storage areas to which the write data 130 is to be written does not coincide with the beginning or the end of any physical sector of the disk 610. In the example in FIG. 6, the storage apparatus 100 accepts the write data 130 to be written into the target storage areas L0 to L9 identified by the LBAs "0" to "9", respectively.

Upon acceptance of the write data 130, the storage apparatus 100 determines whether the write data 130 is aligned data. For example, the storage apparatus 100 determines whether the beginning and the end of the target storage areas coincide with the beginning of any physical sector and the end of any physical sector, respectively, of the disk 610. In this example, the beginning of the target storage areas L0 to L9 coincides with the beginning of the physical sector P0 but the end of the target storage areas L0 to L9 does not coincide with the end of any of the physical sectors P0 and P1. In other words, the write data 130 is not aligned data.

Accordingly, after complementing the end side of the write data 130 to convert the write data 130 into aligned data, the storage apparatus 100 controls the writing of the write data 130 on the disk 610. For example, the storage apparatus 100 searches the cache memory 620 for data to be added to the end side of the write data 130, which is stored in the logical sectors LA to LF. Then, if the data has been hit, the storage apparatus 100 extracts the hit data from the cache memory 620 to add the extracted data to the end of the write data 130. The storage apparatus 100 is capable of generating aligned data from the write data 130 in the above-described manner.

The storage apparatus 100 controls the writing of the generated aligned data on the disk 610. For example, the storage apparatus 100 transmits the 4-kB data in the generated aligned data, the target storage area of which is the physical sector P0, to the disk 610 in units of 512 B as a write command. The disk 610 integrates the received data into data in units of 4 kB to write the data on the physical sector P0 without the RMW operation.

In addition, the storage apparatus 100 transmits the 4-kB data in the generated aligned data, the target storage area of which is the physical sector P1, to the disk 610 in units of 512 B as a write command. The disk 610 integrates the received data into data in units of 4 kB to write the data on the physical sector P1 without the RMW operation. This allows the storage apparatus 100 to decrease the number of times of access to the disk 610 in the writing of the write data 130. As a result, the storage apparatus 100 is capable of suppressing an occurrence of a rotation waiting time of the disk 610 due to the RMW operation to speed up the writing of data.

If the data to be added to the end side of the write data 130 is not hit, the storage apparatus 100 controls the writing of the unaligned write data 130 on the disk 610. For example, the storage apparatus 100 transmits the data in the unaligned write data 130, the target storage area of which is the physical sector P0, to the disk 610 in units of 512 B as a write command. The disk 610 integrates the received data into data in units of 4 kB to write the data on the physical sector P0 without the RMW operation.

In addition, the storage apparatus 100 transmits the data in the unaligned write data 130, the target storage area of which is the physical sector P1, to the disk 610 in units of 512 B as a write command. Since the received data is smaller than 4 kB, the disk 610 generates aligned data from the received data by the RMW operation to write the generated data on the physical sector P1. Then, the storage apparatus 100 reads out the data on the physical sector P1 subjected to the RMW operation by the disk 610 to store the read out data in the cache memory 620. When the RMW operation is performed by the disk 610, the storage apparatus 100 stores the data in the cache memory 620 so that the data is capable of being searched for in the subsequent writing.

An exemplary update of the cache memory 620 in the first exemplary operation will now be described with reference to FIG. 7 and FIG. 8. Referring to FIG. 7, the storage apparatus 100 accepts write data 130 the target storage areas of which are logical sectors L2 to L11. Then, the storage apparatus 100 determines that the beginning of the target storage areas L2 to L11 does not coincide with the beginning of any of the physical sectors P0 to P2 of the disk 610 and determines that the end of the target storage areas L2 to L11 does not coincide with the end of any of the physical sectors P0 to P2 of the disk 610.

The storage apparatus 100 searches the cache memory 620 for the data stored in the logical sectors L0 and L1, to be added to the beginning side of the write data 130, by using the MRU table 300 and the MFU table 400. For example, the storage apparatus 100 searches the records in the MRU table 300 and the MFU table 400 for the record the address item of which includes the LBAs "0" and "1".

In addition, the storage apparatus 100 searches the cache memory 620 for the data stored in the logical sectors L12 to L17, to be added to the end side of the write data 130, by using the MRU table 300 and the MFU table 400. For example, the storage apparatus 100 searches the records in the MRU table 300 and the MFU table 400 for the record the address item of which includes the LBAs "12" to "17".

Since the MRU table 300 includes the record the address item of which includes the LBAs "0" and "1", the storage apparatus 100 determines that the data stored in the logical sectors L0 and L1 is stored in the cache memory 620. Then, the storage apparatus 100 extracts the data stored in the logical sectors L0 and L1 from the cache memory 620. The storage apparatus 100 adds the extracted data to the beginning of the write data 130. The description will be continued with reference to FIG. 8.

Referring to FIG. 8, the storage apparatus 100 transmits the data, the target storage areas of which are the logical sectors L0 to L7, in units of 512 B as a write command to the disk 610.

The disk 610 integrates the received data, the target storage areas of which are the logical sectors L0 to L7, into data in units of 4 kB to write, without the RMW operation, the data on the physical sector P0 to which the logical sectors L0 to L7 are allocated.

In addition, the storage apparatus 100 transmits the data, the target storage areas of which are the logical sectors L8 to LF, in units of 512 B as a write command to the disk 610. The disk 610 integrates the received data, the target storage areas of which are the logical sectors L8 to LF, into data in units of 4 kB to write, without the RMW operation, the data on the physical sector P1 to which the logical sectors L8 to LF are allocated.

Furthermore, the storage apparatus 100 transmits the data, the target storage areas of which are the logical sectors L10 to L11, in units of 512 B as a write command to the disk 610. Since the received data is smaller than 4 kB, the disk 610 generates aligned data from the received data by the RMW operation to write the generated data on the physical sector P2.

Since the record, in the MRU table 300, that indicates the range of the LBAs "0" to "7" is used, the storage apparatus 100 moves the record indicating the range of the LBAs "0" to "7" to the MFU table 400. Since no record indicating the range of the LBAs "10" to "17" for which the RMW operation is performed exists in the MRU table 300, the storage apparatus 100 adds the record indicating the range of the LBAs "10" to "17" and the valid flag "0" to the MRU table 300.

Then, the storage apparatus 100 reads out the data stored in the logical sectors L10 to L17 identified by the LBAs "10" to "17", respectively, which are indicated by the record the valid flag of which is "0", from the disk 610 to store the read out data in the cache memory 620. The storage apparatus 100 changes the value of the valid flag from "0" to "1". The storage apparatus 100 stores the data on the physical sector P2 for which the RMW operation is performed by the disk 610 in the cache memory 620 so that the data is capable of being searched for in the subsequent writing.

Second Exemplary Operation

Figure 9:
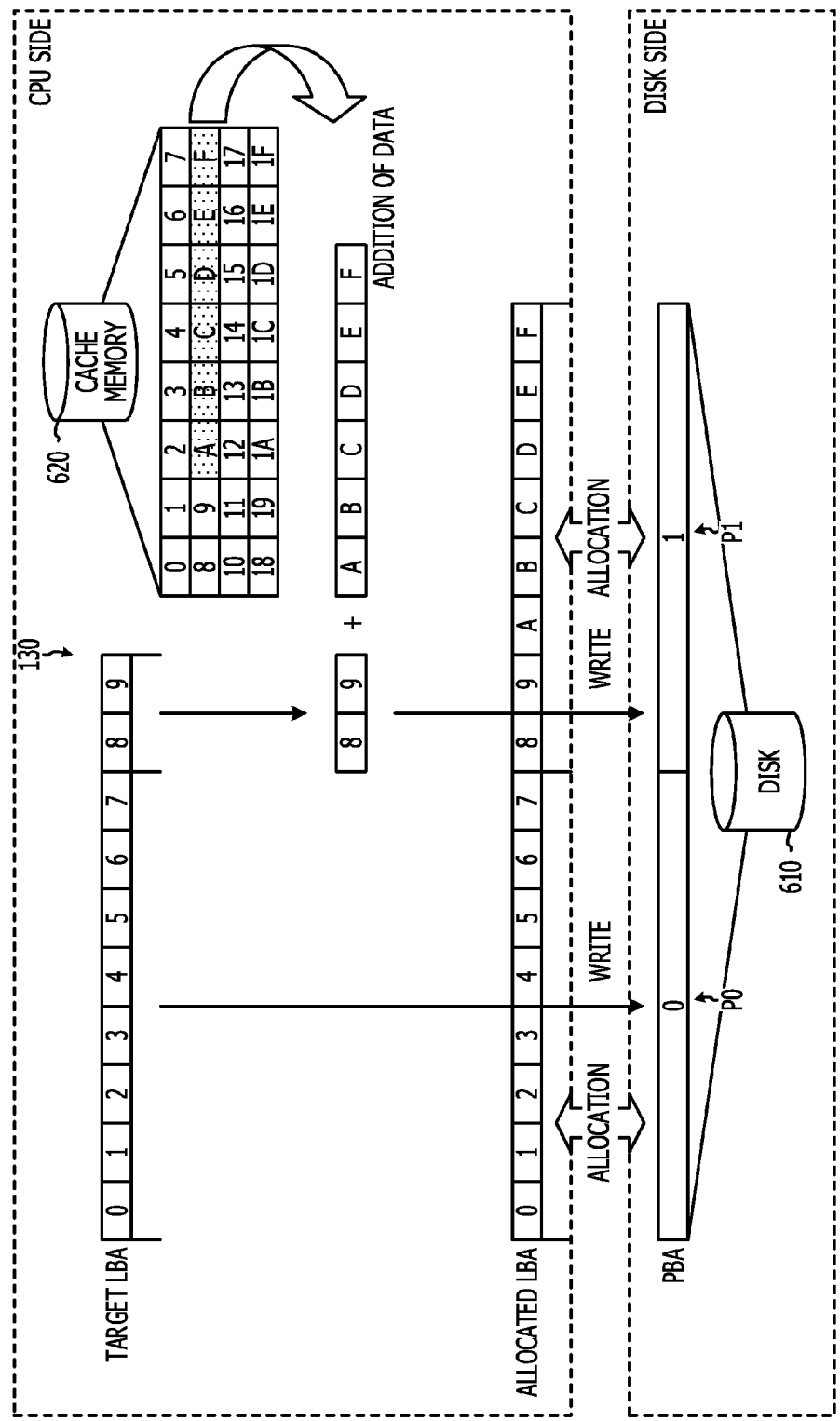
FIG. 9 is a diagram illustrating a second exemplary operation.
Figure 10:
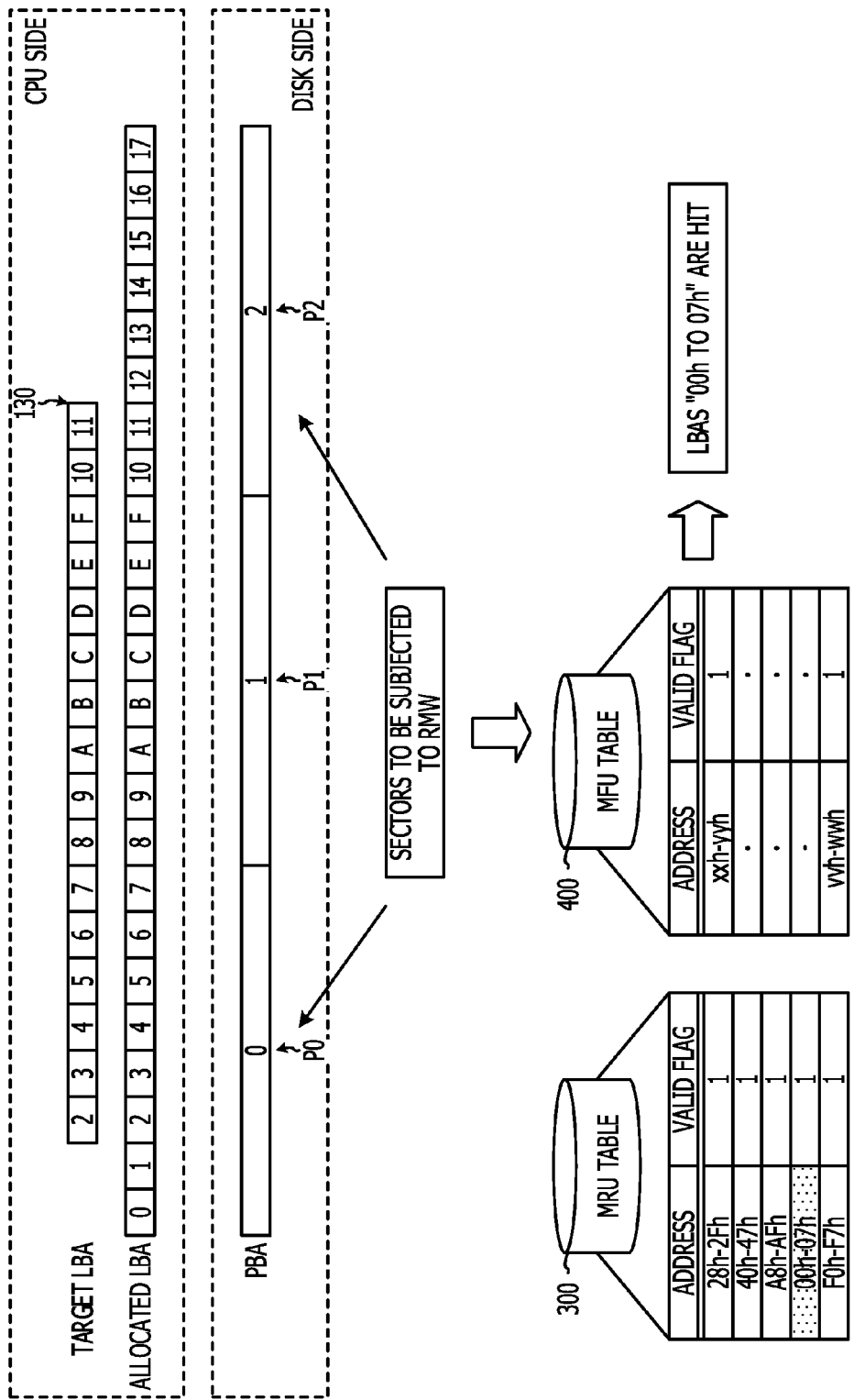
FIG. 10 is a diagram illustrating a second exemplary operation.
Figure 11:
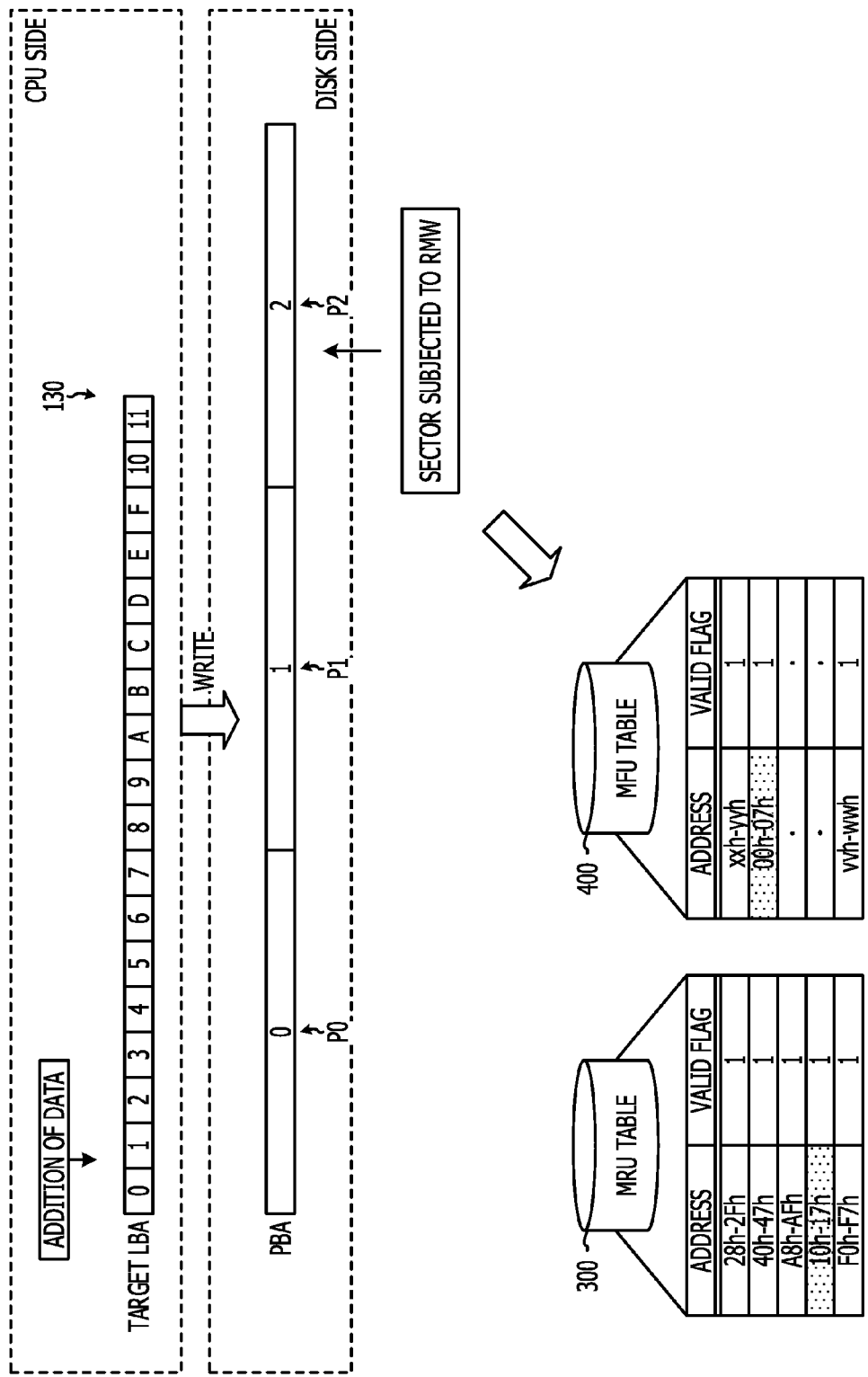
FIG. 11 is a diagram illustrating a second exemplary operation.

FIG. 9 to FIG. 11 are diagrams illustrating the second exemplary operation. An exemplary control of the writing on disk 610 in the second exemplary operation will now be described with reference to FIG. 9. Referring to FIG. 9, the storage apparatus 100 includes the disk 610 and the cache memory 620.

The disk 610 is a storage medium which includes physical sectors partitioned in units of a certain length and in which data of the certain length is read out from and written into each partitioned physical sector. In the example in FIG. 9, the disk 610 includes the physical sectors in units of 4 kB. Accordingly, data is read out from and written on the disk 610 in units of 4 kB. More specifically, the disk 610 includes a 4-kB physical sector identified by the PBA "0" and a 4-kB physical sector identified by the PBA "1". Since the cache memory 620 is the same as that in FIG. 6, a description of the cache memory 620 is omitted here.

The storage apparatus 100 allocates the 512-B logical sectors L0 to L7 identified by the LBAs "0" to "7", respectively, to the 4-kB physical sector P0 identified by the PBA "0" on the disk 610. The storage apparatus 100 allocates the 512-B logical sectors L8 to LF identified by the LBAs "8" to "F", respectively, to the 4-kB physical sector P1 identified by the PBA "1" on the disk 610.

An exemplary process of controlling the writing of the write data 130 on the disk 610 will now be described, taking a case in which the storage apparatus 100 has accepted the unaligned write data 130 as an example. In the example in FIG. 9, the storage apparatus 100 accepts write data 130 to be written into the target storage areas L0 to L9 identified by the LAB "0" to "9", respectively, as in the example in FIG. 6.

Upon acceptance of the write data 130, the storage apparatus 100 determines whether the write data 130 is aligned data. For example, the storage apparatus 100 determines whether the beginning and the end of the target storage areas coincide with the beginning of any physical sector and the end of any physical sector of the disk 610. As in the example in FIG. 6, the write data 130 is not aligned data.

Accordingly, after complementing the end side of the write data 130 to convert the write data 130 into aligned data, the storage apparatus 100 controls the writing of the write data 130 on the disk 610. For example, the storage apparatus 100 searches the cache memory 620 for data to be added to the end side of the write data 130, which is stored in the logical sectors LA to LF. Then, if the data has been hit, the storage apparatus 100 extracts the hit data from the cache memory 620 to add the extracted data to the end of the write data 130. The storage apparatus 100 is capable of generating aligned data from the write data 130 in the above-described manner.

The storage apparatus 100 controls the writing of the generated aligned data on the disk 610. For example, the storage apparatus 100 transmits the 4-kB data in the generated aligned data, the target storage area of which is the physical sector P0, to the disk 610 as a write command. The disk 610 writes the received data on the physical sector P0.

In addition, the storage apparatus 100 transmits the 4-kB data in the generated aligned data, the target storage area of which is the physical sector P1, to the disk 610 as a write command. The disk 610 writes the received data on the physical sector P1. This allows the storage apparatus 100 to decrease the number of times of access to the disk 610 in the writing of the write data 130. As a result, the storage apparatus 100 is capable of suppressing an occurrence of a rotation waiting time of the disk 610 due to the RMW operation to speed up the writing of data.

If the data to be added to the end side of the write data 130 is not hit, the storage apparatus 100 controls the writing of the unaligned write data 130 on the disk 610. For example, the storage apparatus 100 transmits the 4-kB data in the unaligned write data 130, the target storage area of which is the physical sector P0, to the disk 610 as a write command. The disk 610 writes the received data on the physical sector P0.

The storage apparatus 100 extracts the data stored in the physical sector P1 including the data stored in the logical sectors LA to LF to be added to the end side of the write data 130 from the disk 610. Then, the storage apparatus 100 extracts the data stored in the logical sectors LA to LF from the extracted data. The storage apparatus 100 adds the data extracted from the logical sectors LA to LF to the end of the data, the target storage area of which is the physical sector P1, in the unaligned write data 130. Then, the storage apparatus 100 transmits the data, to which the extracted data is added, to the disk 610 as a write command. The disk 610 writes the received data on the physical sector P1.

Here, the storage apparatus 100 stores the data extracted from the disk 610, which has been stored in the physical sector P1, in the cache memory 620. When the RMW operation is performed, the storage apparatus 100 stores the data in the cache memory 620 so that the data is capable of being searched for in the subsequent writing.

An exemplary update of the cache memory 620 in the second exemplary operation will now be described with reference to FIG. 10 and FIG. 11. Referring to FIG. 10, the storage apparatus 100 accepts write data 130 the target storage areas of which are the logical sectors L2 to L11. Then, the storage apparatus 100 determines that the beginning of the target storage areas L2 to L11 does not coincide with the beginning of any of the physical sectors P0 to P2 of the disk 610 and determines that the end of the target storage areas L2 to L11 does not coincide with the end of any of the physical sectors P0 to P2 of the disk 610.

The storage apparatus 100 searches the cache memory 620 for the data stored in the logical sectors L0 and L1, to be added to the beginning side of the write data 130, by using the MRU table 300 and the MFU table 400. For example, the storage apparatus 100 searches the records in the MRU table 300 and the MFU table 400 for the record the address item of which includes the LBAs "0" and "1".

In addition, the storage apparatus 100 searches the cache memory 620 for the data stored in the logical sectors L12 to L17, to be added to the end side of the write data 130, by using the MRU table 300 and the MFU table 400. For example, the storage apparatus 100 searches the records in the MRU table 300 and the MFU table 400 for the record the address item of which includes the LBAs "12" to "17".

Since the MRU table 300 includes the record the address item of which includes the LBAs "0" and "1", the storage apparatus 100 determines that the data stored in the logical sectors L0 and L1 is stored in the cache memory 620. Then, the storage apparatus 100 extracts the data stored in the logical sectors L0 and L1 from the cache memory 620. The storage apparatus 100 adds the extracted data to the beginning of the write data 130. The description will be continued with reference to FIG. 11.

Referring to FIG. 11, the storage apparatus 100 transmits the 4-kB data, the target storage area of which is the physical sector P0 to which the logical sectors L0 to L7 are allocated, as a write command to the disk 610. The disk 610 writes the received 4-kB data on the physical sector P0.

In addition, the storage apparatus 100 transmits the 4-kB data, the target storage area of which is the physical sector P1 to which the logical sectors L8 to LF are allocated, as a write command to the disk 610. The disk 610 writes the received 4-kB data on the physical sector P1.

Furthermore, the storage apparatus 100 extracts the data stored in the physical sector P2 including the data stored in the logical sectors L12 to L17 to be added to the end side of the write data 130 from the disk 610. Then, the storage apparatus 100 extracts the data stored in the logical sectors L12 to L17 from the extracted data. The storage apparatus 100 adds the data extracted from the logical sectors L12 to L17 to the end of the data in the write data 130, the target storage areas of which are the logical sectors L10 to L11.

The storage apparatus 100 transmits the 4-kB data, to which the extracted data is added, to the disk 610 as a write command. The disk 610 writes the received 4-kB data on the physical sector P2 without the RMW operation.

Since the record, in the MRU table 300, that indicates the range of the LBAs "0" to "7" is used, the storage apparatus 100 moves the record indicating the range of the LBAs "0" to "7" to the MFU table 400. The storage apparatus 100 stores data identical to the data extracted from the disk 610, which is written on the physical sector P2, in the cache memory 620. Since no record indicating the range of the LBAs "10" to "17" for which the RMW operation is performed exists in the MRU table 300, the storage apparatus 100 adds the record indicating the range of the LBAs "10" to "17" and the valid flag "1" to the MRU table 300.

The storage apparatus 100 stores the data on the physical sector P2 for which the RMW operation is performed in the cache memory 620 so that the data is capable of being searched for in the subsequent writing. In the second exemplary operation, the valid flag item in the MRU table 300 may be omitted.

Writing Control Process

Figure 12:
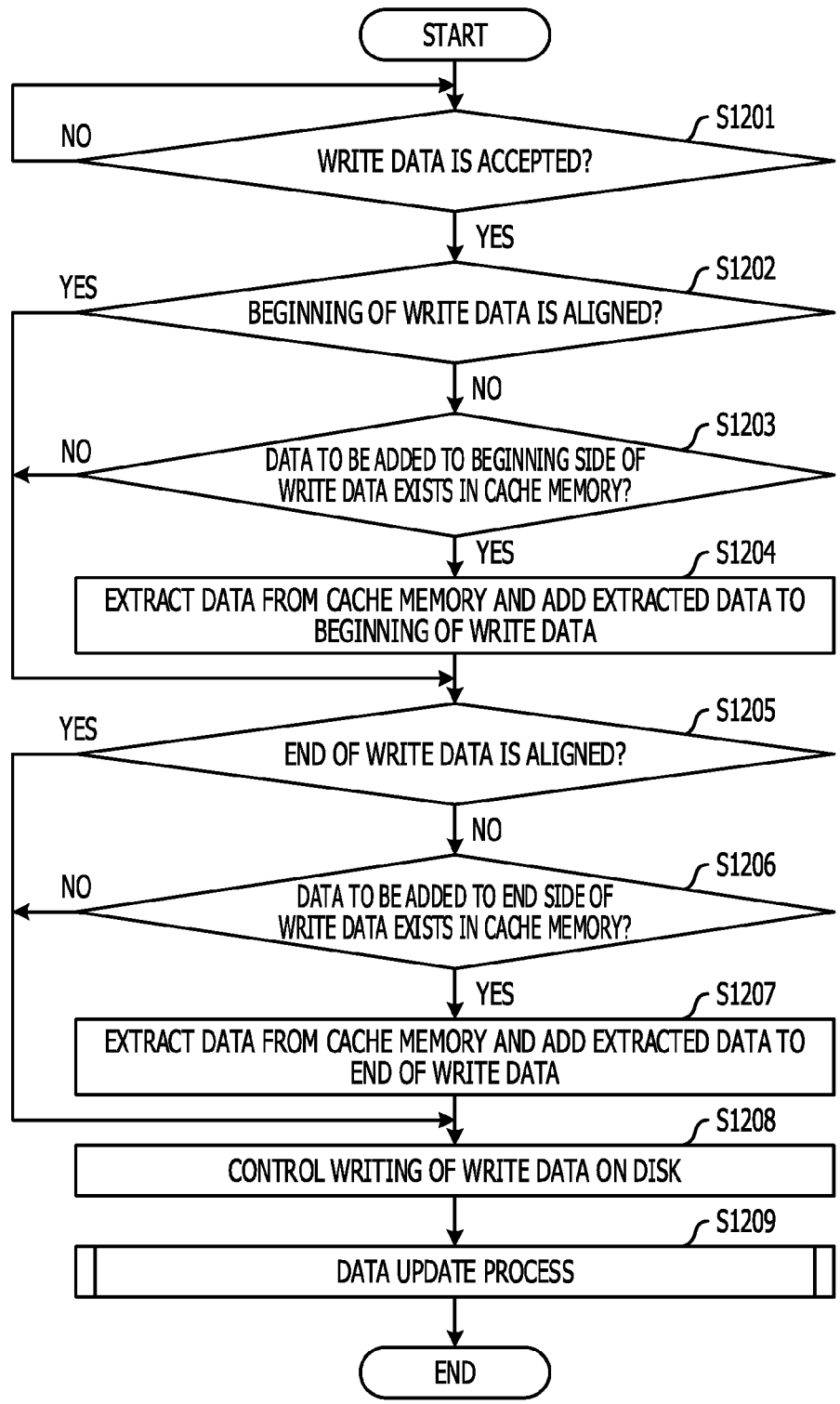
FIG. 12 is a flowchart illustrating an exemplary writing control process.

FIG. 12 is a flowchart illustrating an exemplary writing control process. The first exemplary operation or the second exemplary operation described above is executed in the writing control process.

Referring to FIG. 12, in S1201, the storage apparatus 100 determines whether write data 130 is accepted. If the write data 130 is not accepted (No in S1201), the process goes back to S1201 to wait for acceptance of the write data 130.

If the write data 130 is accepted (YES in S1201), in S1202, the storage apparatus 100 determines whether the beginning of the write data 130 is aligned. If the beginning of the write data 130 is aligned (YES in S1202), the process goes to S1205.

If the beginning of the write data 130 is not aligned (NO in S1202), in S1203, the storage apparatus 100 determines by using the MRU table 300 and the MFU table 400 whether data identical to the data stored in any sector of the disk 610, to be added to the beginning side of the write data 130, exists in the cache memory 620. If the data does not exist in the cache memory 620 (NO in S1203), the process goes to S1205.

If the data exists in the cache memory 620 (YES in S1203), in S1204, the storage apparatus 100 extracts the data from the cache memory 620 and adds the extracted data to the beginning of the write data 130. Then, the process goes to S1205.

In S1205, the storage apparatus 100 determines whether the end of the write data 130 is aligned. If the end of the write data 130 is aligned (YES in S1205), the process goes to S1208.

If the end of the write data 130 is not aligned (NO in S1205), in S1206, the storage apparatus 100 determines by using the MRU table 300 and the MFU table 400 whether data identical to the data stored in any sector of the disk 610, to be added to the end side of the write data 130, exists in the cache memory 620. If the data does not exist in the cache memory 620 (NO in S1206), the process goes to S1208.

If the data exists in the cache memory 620 (YES in S1206), in S1207, the storage apparatus 100 extracts the data from the cache memory 620 and adds the extracted data to the end of the write data 130. Then, the process goes to S1208.

In S1208, the storage apparatus 100 controls the writing of the write data 130 on the disk 610. For example, when the disk 610 is of the first type, the storage apparatus 100 transmits the write data 130 to the disk 610 in units of 512 B as a write command. For example, when the disk 610 is of the second type, the storage apparatus 100 transmits the write data 130 to the disk 610 in units of 4 kB as a write command. If the write data 130 is not capable of being transmitted in units of 4 kB, the storage apparatus 100 generates, by the RMW operation, data capable of written in units of physical sectors from the write data 130 to transmit the generated data in units of 4 kB. In S1209, the storage apparatus 100 executes a data update process described below with reference to FIG. 13. Then, the writing control process is terminated.

With the above-described writing control process, the storage apparatus 100 is capable of decreasing the number of times of access to the disk 610 in the control of the writing of the write data 130 on the disk 610. For example, in the example in FIGS. 12, S1202 and S1203 may be executed in the reverse order and S1205 and S1206 may be executed in the reverse order.

Data Update Process

FIG. 13 is a flowchart illustrating an exemplary data update process. The data update process is executed in S1209 described above. The memory content of the cache memory 620, the MRU table 300, and the MFU table 400 is updated in the data update process.

Referring to FIG. 13, in S1301, the storage apparatus 100 determines whether data is added to the write data 130 in at least one of S1204 and S1207. If no data is added to the write data 130 in S1204 and S1207 (NO in S1301), the process goes to S1305.

If data is added to the write data 130 in at least one of S1204 and S1207 (YES in S1301), in S1302, the storage apparatus 100 updates the memory content of the cache memory 620 on the basis of the data added to the write data 130.

In S1303, the storage apparatus 100 determines whether the added data is identical to the data stored in the logical sectors identified by the LBA range indicated by an address item of the MRU table 300. If the added data is not identical to the data stored in the logical sectors identified by the LBA range indicated by an address item of the MRU table 300 (NO in S1303), the process goes to S1305.

If the added data is identical to the data stored in the logical sectors identified by the LBA range indicated by an address item of the MRU table 300 (YES in S1303), in S1304, the storage apparatus 100 moves the record including the address item to the MFU table 400. Then, the process goes to S1305.

In S1305, the storage apparatus 100 determines whether the RMW operation is performed in S1208. If the RMW operation is not performed in S1208 (NO in S1305), the data update process is terminated.

If the RMW operation is performed in S1208 (YES in S1305), in S1306, the storage apparatus 100 stores the data stored in the sector for which the RMW operation is performed in the cache memory 620. Then, the data update process is terminated. With the above-described data update process, the storage apparatus 100 is capable of updating the memory content of the cache memory 620, the MRU table 300, and the MFU table 400 in preparation for the subsequent writing of data on the disk 610.

As described above, when the beginning or the end of the write data 130 is unaligned, the storage apparatus 100 generates data having an aligned beginning and an aligned end by using the write data 130 and the data in the second storage unit 120 to write the generated data into the first storage unit 110. Accordingly, the storage apparatus 100 is capable of decreasing the number of times of access to the disk 610 in the writing of the write data 130 into the first storage unit 110 to speed up the writing of data into the first storage unit 110.

For example, there is a case in which the beginning of the write data 130 is unaligned. In this case, for example, the storage apparatus 100 adds data identical to the data stored in the storage areas preceding the target storage areas of the write data 130 within a storage area in the first storage unit 110. The storage apparatus 100 is capable of generating data having an aligned beginning from the write data 130 having an unaligned beginning in the above-described manner. The storage apparatus 100 is capable of writing the generated data into the first storage unit 110 without the RMW operation.

For example, there is a case in which the end of the write data 130 is unaligned. In this case, for example, the storage apparatus 100 adds data identical to the data stored in the storage areas succeeding the target storage areas of the write data 130 within a storage area in the first storage unit 110. The storage apparatus 100 is capable of generating data having an aligned end from the write data 130 having an unaligned end in the above-described manner. The storage apparatus 100 is capable of writing the generated data into the first storage unit 110 without the RMW operation.

For example, when the beginning and the end of the write data 130 are aligned, the storage apparatus 100 directly writes the write data 130 into the first storage unit 110. This allows the storage apparatus 100 to write the write data 130 into the first storage unit 110 without the RMW operation.

When the storage apparatus 100 generates data to write the generated data into any storage area in the first storage unit 110, the storage apparatus 100 updates the data stored in the second storage unit 120 associated with the storage area on the basis of the written data. This allows the storage apparatus 100 to make the data stored in the first storage unit 110 is identical to the data stored in the second storage unit 120 corresponding to the data stored in the first storage unit 110.

When the RMW operation is performed, the storage apparatus 100 stores data identical to the data written into the first storage unit 110 by the RMW operation in the second storage unit 120. This allows the storage apparatus 100 to write data without the RMW operation in the subsequent writing of the data into the same storage area as that into which the data is written in the current RMW operation.

If a certain number of pieces or more of data are stored in the second storage unit 120, the storage apparatus 100 deletes the data that has been stored in the second storage unit 120 earliest in the certain number of pieces or more of data. This allows the storage apparatus 100 to store the certain number of pieces of data in the second storage unit 120, which have been most recently stored, while suppressing the usage of the storage areas of the second storage unit 120.

If a certain number of pieces or more of data have not been used since they have been stored in the second storage unit 120, the storage apparatus 100 deletes the data that has been stored in the second storage unit 120 earliest in the certain number of pieces or more of data that have not been used. If a certain number of pieces or more of data have been used since they have been stored in the second storage unit 120, the storage apparatus 100 deletes the data that has been used earliest in the certain number of pieces or more of data that have been used. This allows the storage apparatus 100 to store the certain number of pieces of data that have been most recently used among the data stored in the second storage unit 120 while suppressing the usage of the storage areas of the second storage unit 120.

The writing control method described above in the embodiments may be realized by a computer, such as a personal computer or a workstation, which executes a program that has been prepared in advance. The writing control program is recorded on a computer readable recording medium, such as a hard disk, a flexible disk, a compact disk-read only memory (CD-ROM), a magneto-optical (MO) disk, or a digital versatile disk (DVD), and is executed by the computer that reads out the program from the recording medium. The writing control program may be distributed over a network, such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage apparatus comprising:
   a first storage unit including storage areas partitioned in units of a certain length, data of the certain length being read out from and written into each partitioned storage area;
   a second storage unit configured to store therein cache data identical to data of the certain length, which is stored in one of the storage areas in the first storage unit, in association with the one of the storage areas; and
   a processor configured to
      determine, if a beginning or an end of a target storage area into which write data is to be written is included in a first storage area in the first storage unit, whether the beginning or the end of the target storage area coincides with a beginning or an end of the first storage area,
      extract, if it is determined that the beginning or the end of the target storage area does not coincide with the beginning or the end of the first storage area, complementary data identical to data stored in a sub-storage area in the first storage area from the second storage unit, the sub-storage area not being overlapped with the target storage area,
      generate data to be written into the first storage unit by using the extracted complementary data and the write data, and
      control writing of the generated data into the first storage unit.

2. The storage apparatus according to claim 1, wherein the processor is configured to
   extract, if it is determined that the beginning of the target storage area does not coincide with the beginning of the first storage area, the complementary data identical to the data stored in the sub-storage area that precedes the target storage area within the first storage area from the second storage unit, and
   generate the data to be written into the first storage unit by adding the extracted complementary data to a beginning of the write data.

3. The storage apparatus according to claim 1, wherein the processor is configured to
   extract, if it is determined that the end of the target storage area does not coincide with the end of the first storage area, the complementary data identical to the data stored in the sub-storage area that succeeds the target storage area within the first storage area from the second storage unit, and
   generate the data to be written into the first storage unit by adding the extracted complementary data to an end of the write data.

4. The storage apparatus according to claim 1, wherein the processor is configured to
   control, if it is determined that the beginning and the end of the target storage area coincide with the beginning and the end of the first storage area, writing of the write data into the first storage unit.

5. The storage apparatus according to claim 1, wherein the processor is configured to
   update cache data associated with the first storage area in the second storage unit on basis of the generated data.

6. The storage apparatus according to claim 1, wherein the processor is configured to
   read out data stored in a second storage area from the first storage unit if the beginning or the end of the target storage area is included in the second storage area, data identical to the data stored in the second storage area not being stored in the second storage unit, and store the read out data in the second storage unit in association with the second storage area.

7. The storage apparatus according to claim 5, wherein the processor is configured to delete, if a certain number of pieces or more of cache data are stored in the second storage unit, an oldest piece of cache data in the certain number of pieces or more of cache data.

8. The storage apparatus according to claim 6, wherein the processor is configured to delete, if a certain number of pieces or more of cache data are stored in the second storage unit, an oldest piece of cache data in the certain number of pieces or more of cache data.

9. The storage apparatus according to claim 5, wherein the processor is configured to delete, if a certain number of pieces or more of cache data from which complementary data has not been extracted are stored in the second storage unit, an oldest piece of cache data in the certain number of pieces or more of cache data.

10. The storage apparatus according to claim 6, wherein the processor is configured to delete, if a certain number of pieces or more of cache data from which complementary data has not been extracted are stored in the second storage unit, an oldest piece of cache data in the certain number of pieces or more of cache data.

11. The storage apparatus according to claim 5, wherein the processor is configured to delete, if a certain number of pieces or more of cache data from which complementary data has been extracted are stored in the second storage unit, an oldest piece of cache data in the certain number of pieces or more of cache data.

12. The storage apparatus according to claim 6, wherein the processor is configured to delete, if a certain number of pieces or more of cache data from which complementary data has been extracted are stored in the second storage unit, an oldest piece of cache data in the certain number of pieces or more of cache data.

13. A writing control method comprising:

determining by a computer, if a beginning or an end of a target storage area into which write data is to be written is included in a first storage area in a first storage unit, whether the beginning or the end of the target storage area coincides with a beginning or an end of the first storage area;

extracting, if it is determined that the beginning or the end of the target storage area does not coincide with the beginning or the end of the first storage area, complementary data identical to data stored in a sub-storage area in the first storage area from a second storage unit, the sub-storage area not being overlapped with the target storage area;

generating data to be written into the first storage unit by using the extracted complementary data and the write data; and controlling writing of the generated data into the first storage unit.

14. A computer-readable recording medium having stored therein a program for causing a computer to execute a process, the process comprising:

determining, if a beginning or an end of a target storage area into which write data is to be written is included in a first storage area in a first storage unit, whether the beginning or the end of the target storage area coincides with a beginning or an end of the first storage area;

extracting, if it is determined that the beginning or the end of the target storage area does not coincide with the beginning or the end of the first storage area, complementary data identical to data stored in a sub-storage area in the first storage area from a second storage unit, the sub-storage area not being overlapped with the target storage area;

generating data to be written into the first storage unit by using the extracted complementary data and the write data; and controlling writing of the generated data into the first storage unit.

\* \* \* \* \*